(12) United States Patent
Huang et al.

(10) Patent No.: US 7,354,179 B2
(45) Date of Patent: Apr. 8, 2008

(54) PRISM SET AND LIGHT EMITTING APPARATUS USING THE SAME

(75) Inventors: Jyh-Haur Huang, Pingtung Hsien (TW); Jing-Huan Liao, Taoyuan (TW); Ming-Fa Wang, Miao Li Hsien (TW); Chih-Kuang Chen, Kaohsiung (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 11/401,387

(22) Filed: Apr. 11, 2006

(65) Prior Publication Data

US 2006/0227548 A1    Oct. 12, 2006

(30) Foreign Application Priority Data

Apr. 12, 2005    (TW) .............................. 94111553 A

(51) Int. Cl.
*F21V 5/00*    (2006.01)

(52) U.S. Cl. ...................... 362/337; 362/339; 362/626; 359/832

(58) Field of Classification Search ................ 362/337, 362/339, 257, 607, 616, 612, 615, 634, 621, 362/626, 235, 237, 244, 445, 326, 331, 332; 359/832

See application file for complete search history.

(56) References Cited

U.S. PATENT DOCUMENTS

| | | | | |
|---|---|---|---|---|
| 5,191,485 A * | 3/1993 | Kahle | ........................ | 359/834 |
| 5,835,276 A * | 11/1998 | Asai et al. | .................. | 359/638 |
| 6,437,921 B1 * | 8/2002 | Whitehead | ................... | 359/640 |
| 6,994,459 B2 * | 2/2006 | Worsdell et al. | ............ | 362/470 |
| 7,080,933 B2 * | 7/2006 | Chen et al. | ................. | 362/616 |

* cited by examiner

*Primary Examiner*—Jong-Suk (James) Lee
*Assistant Examiner*—Julie A. Shallenberger
(74) *Attorney, Agent, or Firm*—Birch, Stewart, Kolasch & Birch, LLP

(57) ABSTRACT

A prism unit includes a first prism having a first incident face and a first refraction face that is adjacent to and that cooperates with the first incident face to define a first angle ranging 50° to 70°, a second prism having a second incident face that is generally parallel to the first refraction face and a medium layer sandwiched between the first refraction face and the second incident face, and having a refractive index smaller than that of the first and second prisms.

23 Claims, 8 Drawing Sheets

PRISM SET AND LIGHT EMITTING APPARATUS USING THE SAME

FIELD OF THE INVENTION

This application claims the benefit of Taiwan Application Serial No. 094111553, filed Apr. 12, 2005, the subject matter of which is incorporated herein by reference.

The present invention relates to a prism set and a light emitting apparatus using the same, more particularly to a prism set for use in a backlight module in order to enhance the light distribution produced thereby.

BACKGROUND OF THE INVENTION

An LED unit is able to convert the electrical power directly into the light power. Due to its swift response, a relatively small size, low power consumption, low working voltage to drive the same, long service life (from 100 thousand hours to 10 million hours), firm stability, tolerable to high vibration and low manufacture cost, the LED units are widely used in the display devices, or used as an optical fiber light source applied to short-distance communication. The late LCD devices are implemented with a backlight module that uses the LED units therein. Thus, a research leading to improvement of the LED unit becomes an important object for the manufacturers.

The LED unit includes a die and two electric wires and is said to be compatible with the Lambert's cosine law. Thus, the LED unit is sometimes called a Lambertian source. Its specific feature is that the light emitting strength of the LED unit is directly proportional to a cosine of the viewing angle. The brightness values thereof and the viewing angle have no interrelationship. In order to control the brightness in different directions, a lens is disposed above the die within the packaged LED so as to guide the light rays emitted from the die. FIG. 1A shows a conventional lens 10 employed in the prior LED unit. The conventional lens 10 has a dome-shaped top portion, providing a viewing angle ranging 0° to 90°.

FIG. 1B illustrates a candela distribution representing brightness values varying with the viewing angles when the light rays pass through the conventional lens 10. When the viewing angle is 0°, the lens 10 provides the maximum value of brightness $90 \times 10^3$ nits, which decreases as the viewing angle is increased. When the viewing angle is increased to 90°, the brightness value is 0 nits. Therefore, it is observable that in the conventional lens 10, the light rays generally collect to the viewing angle 0° after passing through the lens 10. FIG. 1C illustrates a graph of a simulation of a backlight module, within which the LED unit implementing the conventional lens 10 is provided. The vertical axis indicates the brightness values while the horizontal axis indicates the distance. By observing the fluctuation of the curve, it can be noted that there is uneven brightness in the different regions.

In order to provide uniform light distribution in the backlight module, a direct-type backlight module with LED units from Lumileds Co. is preferred to when compared with the other backlight modules.

FIG. 2A is an exploded view of the direct-type backlight module 20 with LED units. The backlight module 20 includes a receptacle body 21 (generally a metal casing), a plurality of LED units 22 mounted on a bottom plate 211 of the receptacle body 21 in array in order to form two light bars. A diffusing plate 23 is disposed above the receptacle body 21 to diffuse the light rays emitted from the LED units 22.

FIG. 2B shows a packaged LED unit 22 employed in the backlight module of FIG. 2A, and includes an outer casing 221, a lens 222 and two fastening pieces 2211 projecting outwardly from the casing 221 in order to fix the packaged LED unit 22 to the bottom plate 211 of the receptacle body 21. A die (not visible) is enclosed within the outer casing 221. The lens 222 is fixed on top of the outer casing 221 to guide the light rays emitted from the die in ±90°.

FIG. 2C is an LED lens 222 designed and produced by the Lummiled Co., and has an inverted cone-shaped top portion formed with concave inner surface to reflect the light rays therefrom. Thus, the light rays emitted from within the outer casing 221 are reflected and diffused from the concave inner surface of the top portion of the LED lens 222 in ±90° FIG. 2D is a graph representing the brightness values with respect to the viewing angles of the LED unit 22 produced by the Lummiled Co. As shown, the light brightness is centered between the 80±20°. In other words, the light rays are barely emitted from the right top of the LED lens 222. FIG. 2E illustrates a graph of a simulation of the backlight module provided with the LED lens 222. The vertical axis indicates the brightness values (nits) while the horizontal axis indicates the distance. By observing the fluctuation of the curve, it can be noted that there is an appropriate brightness uniform in the different regions when the LED lens 222 of the Lummiled Co. is utilized in the backlight module.

From the aforesaid paragraphs, it can be noted that utilization of the conventional lens 10 provides non-uniform brightness in the different viewing angles while the LED lens 222 of the Lummiled Co. provides an appropriate brightness uniform. However, the cost for manufacturing the Lummiled's LED lens 222 is relatively high. It is considerably hard to design the inverted cone-shaped top portion of the Lummiled's LED lens 222 since its structure is complicated.

SUMMARY OF THE INVENTION

The object of the present invention is to provide a light emitting apparatus having a prism set in order to enhance the light distribution in different viewing angles.

In one aspect of the present invention, a prism set is provided to include: a first prism having a first incident face and a first refraction face that is adjacent to and that cooperates with the first incident face to define a first angle ranging 50° to 70°; a second prism having a second incident face that is generally parallel to the first refraction face; and a medium layer sandwiched between the first refraction face and the second incident face, and having a refractive index smaller than that of the first and second prisms.

In another aspect of the present invention, a light emitting apparatus is provided to include: a prism set including a first prism having a first incident face and a first refraction face that is adjacent to and that cooperates with the first incident face to define a first angle ranging 50° to 70°, a second prism having a second incident face that is generally parallel to the first refraction face, and a medium layer sandwiched between the first refraction face and the second incident face, and having a refractive index smaller than that of the first and second prisms; and a light source disposed below the prism set for emitting light rays into the prism set via the first incident face.

In still another aspect of the present invention, a backlight module is provided to include: a receptacle body having a bottom plate; at least one light source disposed on the bottom plate; a prism set disposed above the light source, and including a first prism having a first incident face and a first refraction face that is adjacent to and that cooperates with the first incident face to define a first angle ranging 50° to 70°, a second prism having a second incident face that is generally parallel to the first refraction face, and a medium layer sandwiched between the first refraction face and the second incident face, and having a refractive index smaller than that of the first and second prisms; and a diffusing plate disposed above the prism set.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following detailed description and the accompanying drawings, which are given by way of illustration only, and thus are not limitative of the present invention, and in which.

DETAILED DESCRIPTIONS OF THE PREFERRED EMBODIMENTS

Figure 3:
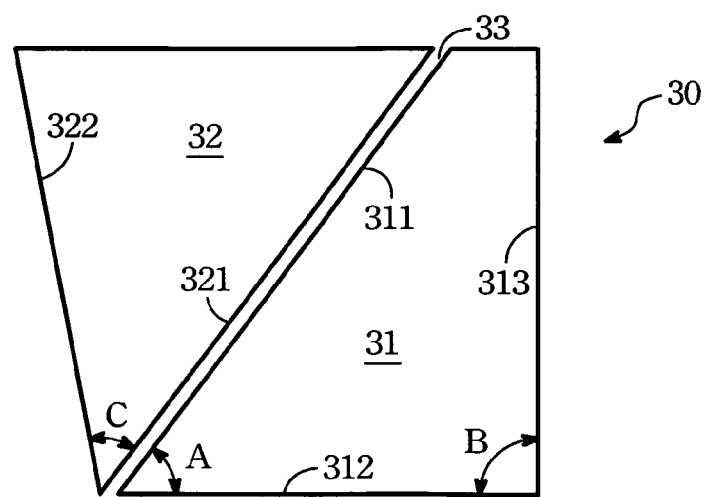
FIG. 3 is a prism set of the present invention.

FIG. 3 is a sectional view of a prism set according to the present invention. The prism set 30 includes a first prism 31, a second prism 32 and a medium layer 33. Both the first prism 31 and the second prism 32 have two end faces and a plurality of inclined planes. The medium layer 33 is sandwiched between the first prism 31 and the second prism 32. The first prism 31 has a first incident face 312 and a first refraction face 311 that is adjacent to and that cooperates with the first incident face 312 to define an angle ranging 50° to 70°. The second prism 32 has a second incident face 321 that is generally parallel to the first refraction face 311. The medium layer 33 is sandwiched between the first refraction face 311 and the second incident face 321, and has a refractive index smaller than that of the first and second prisms 31, 32. The refractive index of the first prism 31 may be equal to or unequal to that of the second prism 32. Prisms like a right-angle prism or a roof prism can be used as the first and second prisms 31, 32 in the present invention. The end faces of the first and second prisms 31, 32 may be triangle, quadrilateral or polygon, that means the first or second prisms 31, 32 can be a triangular, a tetragonal or a polygonal prism.

Preferably, the medium layer 33 is an air gap whose thickness ranges from 0.1 mm to 0.3 mm. The first refraction face 311 cooperates with the first incident face 312 to define an angle A ranging 55° to 65°. In addition, the first prism 31 has a third refraction face 313 that is adjacent to and that cooperates with the first incident face 312 to define an angle B ranging 80° to 85°. The second prism 32 has a second refraction face 322 that is adjacent to and that cooperates with the second incident face 321 to define an angle C ranging 35° to 45°. The air gap separates the angle C from the angle A that corresponds to the angle C. The first and second prisms 31, 32 are made of high refractive index glass or plastic, such as a high quality plain glass (BK7), polymethylmethacrylate (PMMA), polycarbonate (PC) and so on. And also, the first and second prisms 31, 32 may be adjusted slightly to fit the size of the backlight module and the arrangement of the LEDs.

Figure 4:
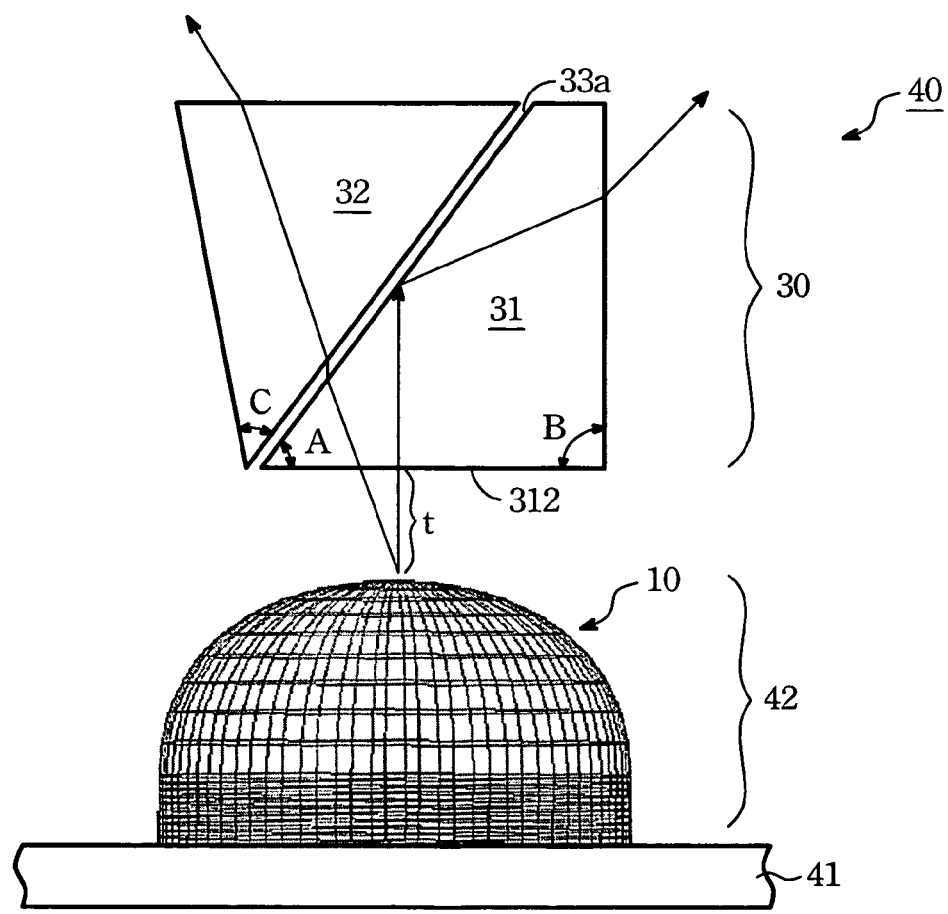
FIG. 4A is a light emitting apparatus of the present invention.
FIG. 4B shows a light path of the prism set in the present invention.
FIG. 4C is a graph representing light flux change of the prisms in a viewing angle ranging −80° to +80°.
FIG. 4D illustrates a graph of a simulation of a backlight module provided with the prism set.
Figure 4:
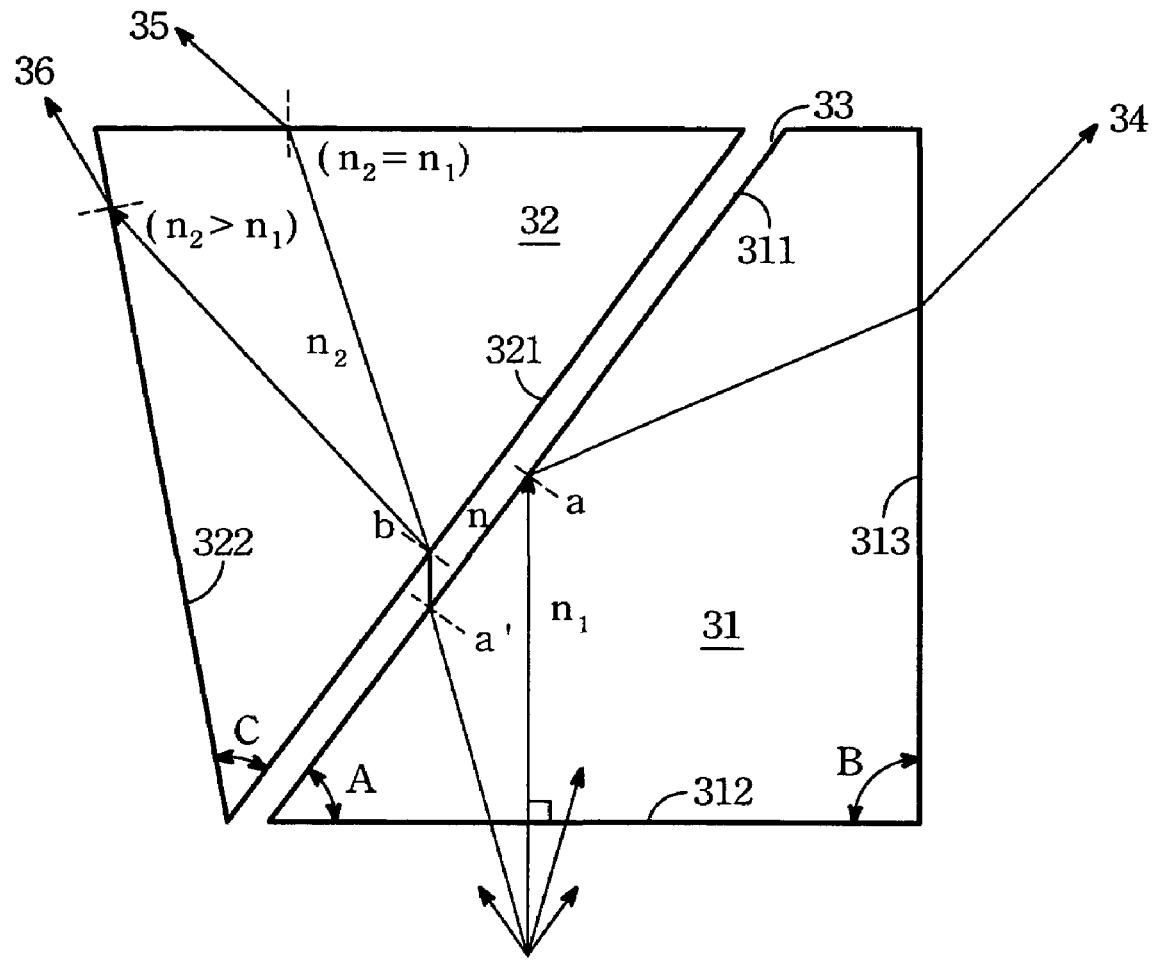
Figure 4:
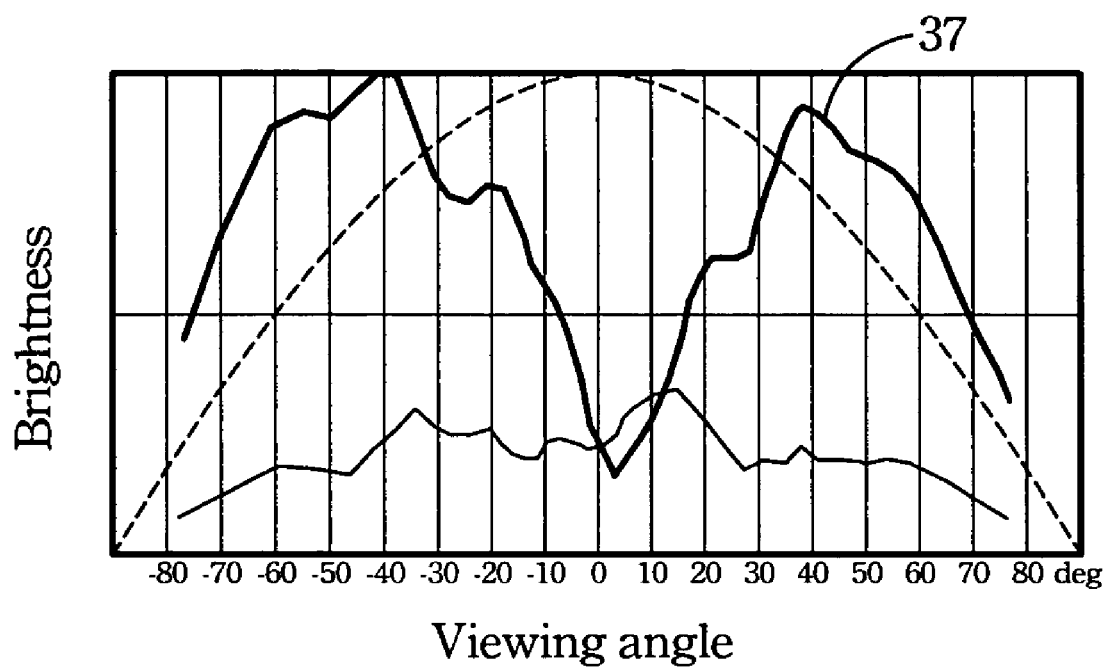
Figure 4:
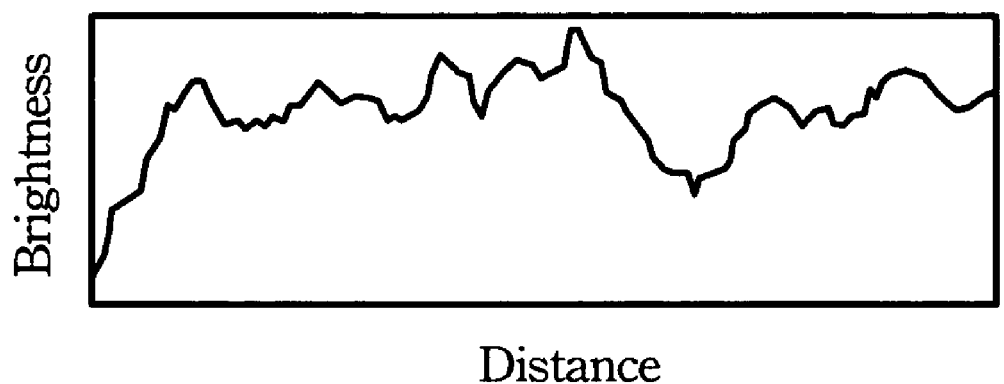

Refer to FIG. 4A, a light emitting apparatus of the present invention is shown. The light emitting apparatus 40 comprises the prism set 30 shown in FIG. 3 and a light source 42. There is an interval t between the light source 42 and the light emitting apparatus 40. The light source 42 is disposed on a bottom plate 41 for emitting light rays into the prism set 30. The emitting direction of light rays is determined by the factors including the different refractive index between the air gap 33a and the prisms 31, 32, the magnitude of the angle A, B or C, and the slope of the first refractory face 311 or the second incident face 321. The light source 42 can be packaged with the conventional lens 10. After going out the lens 10, the light rays enters into the prism set 30 via the first incident face 312. The light source 42 may be a point light unit, such as a LED, or a linear light unit, such as a CCFL.

Preferably, the interval t ranges 0 mm to 3 mm between the light source 42 and the prism set 30. Specifically speaking, the interval t is between the light source 42 and the first incident face 312. The air gap 33a has a suitable thickness ranging from 0.1 mm to 0.3 mm. The preferable prism set 30 has the angle A ranging from 55° to 65°, the angle B ranging from 80° to 85° and the angle C ranging from 35° to 45°. The first and second prisms 31, 32 are made of high refractive index glass or plastic, such as a high quality plain glass (BK7), polymethylmethacrylate (PMMA), polycarbonate (PC) and so on. Note that the angle A, B and C of the prism set 30 are located at the same side which faces toward the light source 42.

FIG. 4B shows a light path of the prism set 30. The light rays goes into the first prism 31 via the first incident face 312, and then reaches the first refraction face 311. If the included angle created by the light path and the normal line of the first refraction face 311 is larger than the critical angle, a total reflection occurs at point "a" on the first refraction face 311. Then, the light rays goes out the prism set 30 after refracted on the third refraction face 313, shown as light path 34. If the included angle created by the light path and the normal line of the first refraction face 311 is smaller than the critical angle, the light rays is refracted on the first refraction face 311 and then go into the medium layer 33. On the second incident face 321, the light rays is refracted again and goes into the second prism 32. As shown in light path 35, if the refractive index of the second prism 32 is equal to that of the first prism 31, the light rays travels in the first and second prisms 31, 32 as two parallel lines. If the refractive index of the second prism 32 is larger than that of the first prism 31, the light rays travels in the second prism 32 as light path 36 that turns to the left side of the light path 35.

Note that whichever of the first and second prisms 31, 32 has a larger refractive index, their refractive indexes must be larger than the refractive index of the medium layer 33. Thus, a part of the light rays is centralized at the left side of the prism set 30 for emitting. The other part of the light rays is centralized at the right side of the prism set 30 for emitting. Accordingly, the brightness at two sides of the prism set 30 is higher than that at the center of the prism set 30.

FIG. 4C is a graph representing light flux change of the prisms in a viewing angle ranging −80° to +80°. The curve 37 shows that the light rays which go through the prism set 30 is centralized in two regions ranging 30° to 50° and −30° to −50°.

Figure 1B:
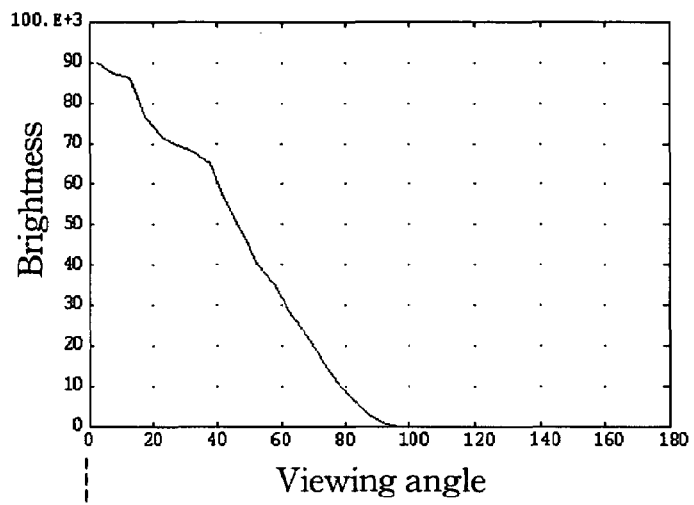
FIG. 1B illustrates a candela distribution representing brightness values with respect to the viewing angles of the prior LED unit.
Figure 1A:
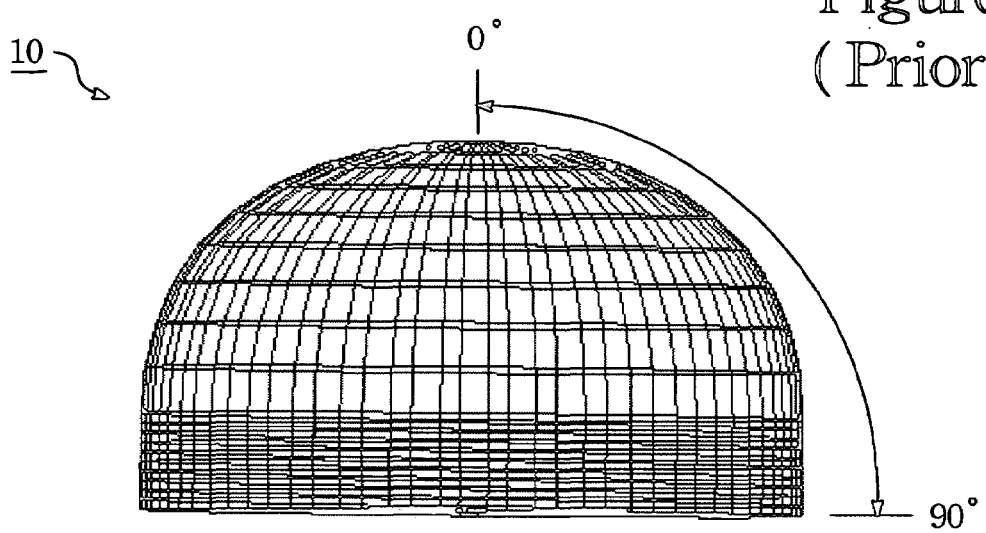
FIG. 1A shows a conventional lens 10 employed in a prior LED unit.
Figure 1C:
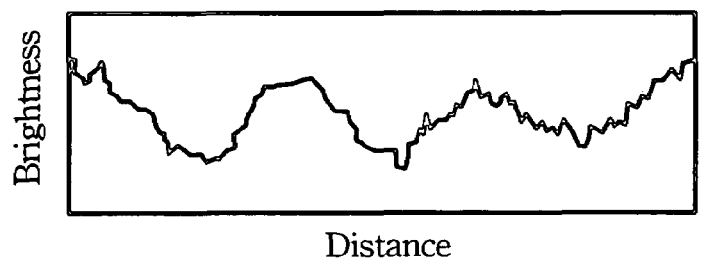
FIG. 1C illustrates a graph of a simulation of a backlight module having the LED unit implemented with the conventional lens.
Figure 2:
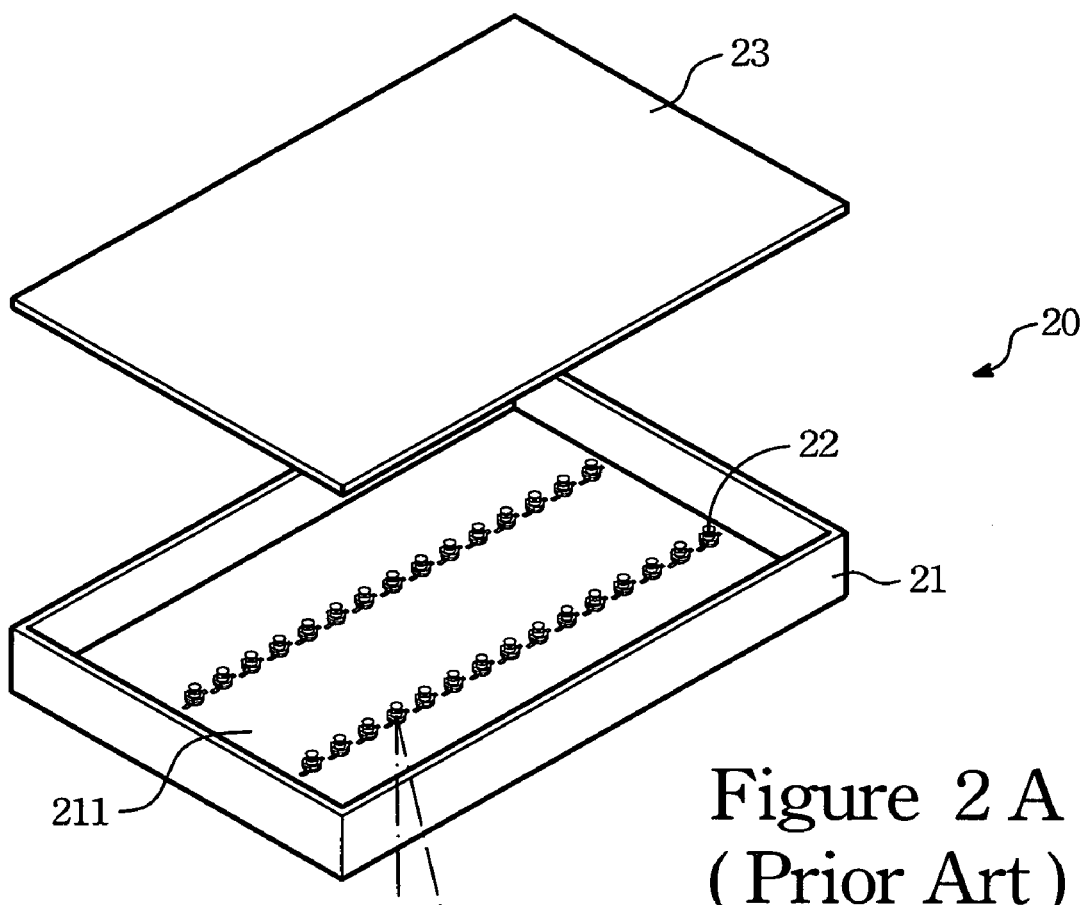
FIG. 2A is an exploded view of the direct-type LED backlight module of the prior art.
FIG. 2B shows a detailed view of one LED unit employed in the backlight module of FIG. 2A.
FIG. 2C is an LED lens designed by the Lummiled Co.
FIG. 2D is a graph representing the brightness values with respect to the viewing angles of the LED unit 22 produced by the Lummiled Co.
FIG. 2E illustrates a graph of a simulation of the backlight module provided with the LED lens shown in 2C.
Figure 2:
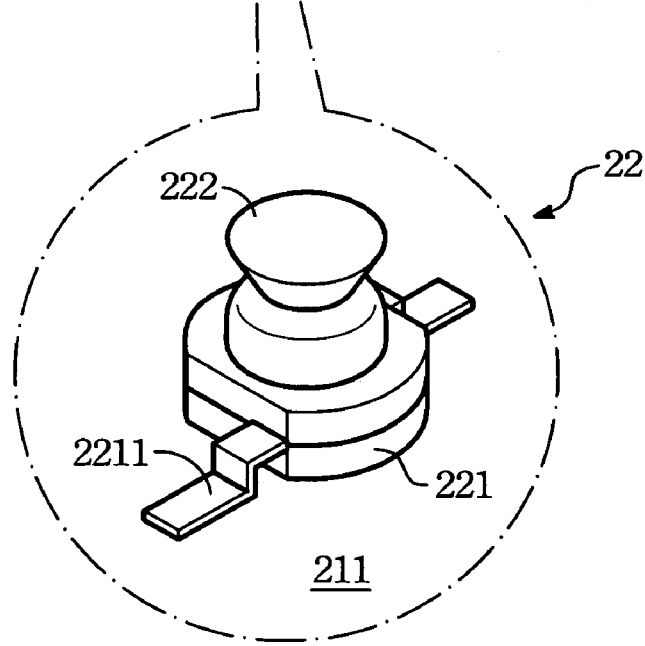
Figure 2D:
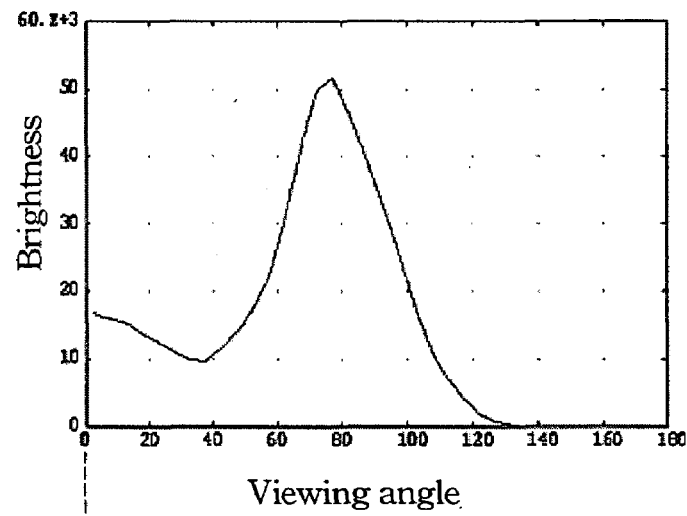
Figure 2C:
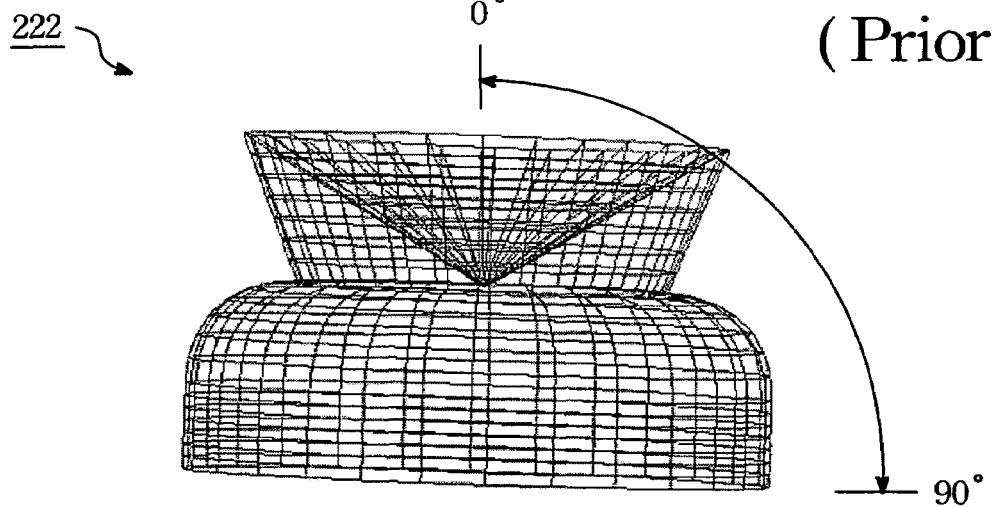
Figure 2E:
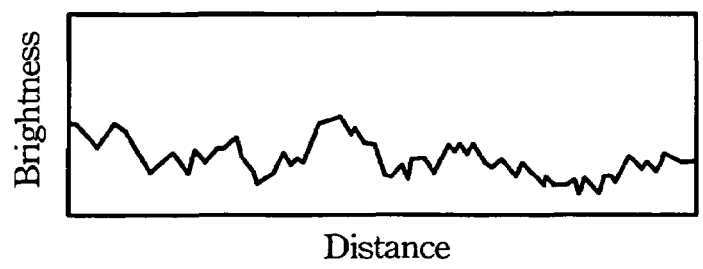

FIG. 4D illustrates a graph of a simulation of a backlight module provided with the prism set 30. The vertical axis indicates the brightness values (nits) while the horizontal axis indicates the distance. By observing the fluctuation of the curve in FIGS. 4D and 2E, it can be noted that there is an appropriate brightness uniform in the different regions and a higher light strength than the prior backlight module. The prism set 30 can centralize a part of the light rays to emit left, and centralize the other part of the light rays to emit right, so that it can be arranged in the backlight module to diffuse the light rays regularly.

Figure 5:
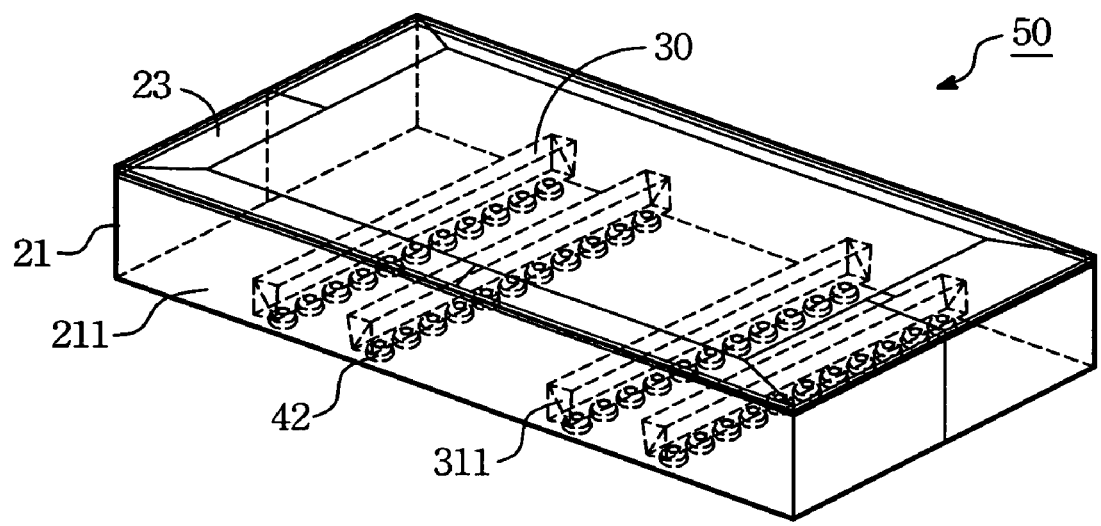
FIG. 5A is the backlight module provided with the prism set shown in FIG. 3.
FIG. 5B is a side view of the backlight module shown in FIG. 5A.
Figure 5:
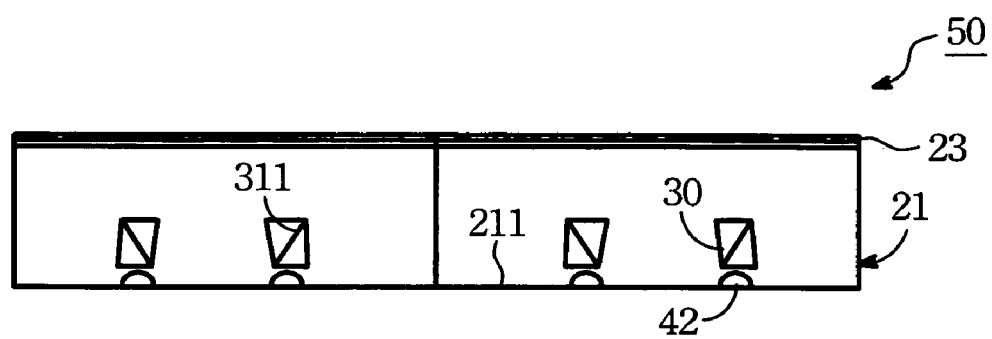

FIG. 5A is the backlight module provided with the prism set shown in FIG. 3. The backlight module 50 comprises the receptacle body 21, at least one light source 42, the prism set 30 and the diffusing plate 23. The receptacle body 21 includes the bottom plate 211 for disposing at least one light source 42. The prism set 30 is disposed on each light source 42. The diffusing plate 23 is covered on the prism set 30. FIG. 5A shows the light source 42 is constructed from a plurality of point light units which are arranged in a row.

FIG. 5B is a side view of the backlight module shown in FIG. 5A. Two adhered prisms 31, 32 of the prism set 30 are fixed on the bottom plate 211 with an external fastener (not shown). In the other way, the two prisms 31, 32 can be independently fixed on the bottom plate 211 without adhering. Therefore, the two prisms 31, 32 can be adjusted slightly to fit the size of the backlight module 50 and the arrangement of the point light units 42. In a preferred embodiment, these point light units 42 is arranged in a plurality of rows. Two prism sets 30 that disposed on an adjacent pair of the rows have two first refraction faces whose slopes are opposite.

Figure 6:
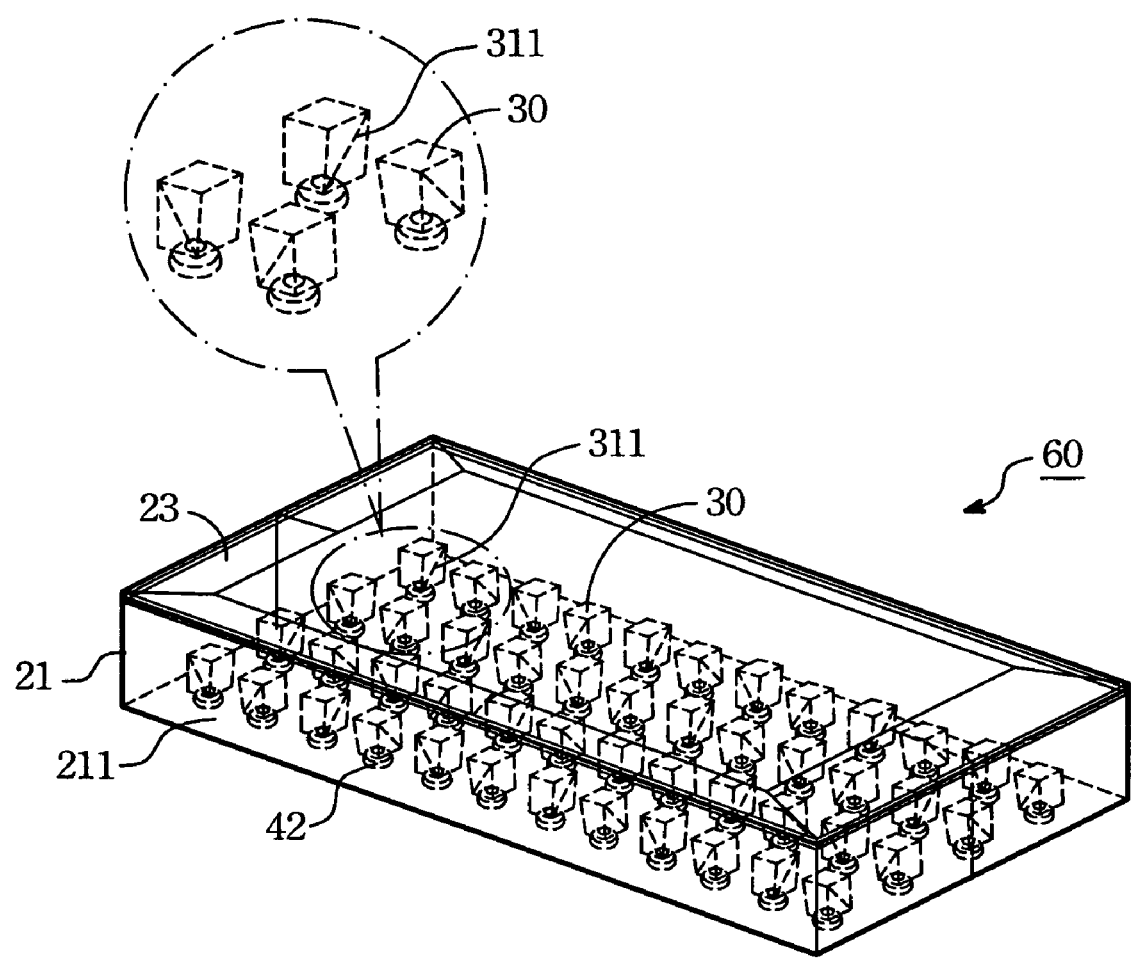
FIG. 6 is another backlight module with a plurality of LED units implemented with the prism set and arranged in an array manner.

FIG. 6 shows that these point light units are arranged in an array manner. On each of these point light units 42 of the array is disposed one prism set 30. Two of the first refraction faces 311 of an adjacent pair of the prism sets define different refraction directions. As shown, the first refraction face 311 of the prism set 30 can face forward or backward, leftward or rightward of the backlight module 60 to diffuse the light rays more uniformly. For application of a direct-type backlight module, a light scattering plate for enhancing uniformity of the light rays and a brightness enhancement film for increasing brightness can be added in above-mentioned backlight module 60.

The advantages of the present invention are:
  a. Replacing the usual side-emitting LED without changing the conventional package, but only increasing the prism set of the present invention;
  b. Cost down due to the materials of the prism set, such as BK7, PMMA or PC etc.;
  c. Allowing to adjust slightly according to the size of the backlight module and the arrangement of the LEDs; and
  d. More flexible design.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A prism set for diffusing light rays, comprising:
  a first prism having a first incident face and a first refraction face that is adjacent to and that cooperates with said first incident face to define an angle ranging 50° to 70°, and having a third refraction face for the light rays to exit from, wherein the third refraction face is located in a first light path which includes a total reflection on the first refraction face;
  a second prism having a second incident face that is generally parallel to said first refraction face, and having a second refraction face for the light rays to exit from, wherein the second refraction face is located in a second light path which includes no reflection; and
  a medium layer sandwiched between said first refraction face and said second incident face, and having a refractive index smaller than that of said first and second prisms.

2. The prism set according to claim 1, wherein said medium layer comprises an air gap.

3. The prism set according to claim 1, wherein said medium layer has a thickness ranging from 0.1 mm to 0.3 mm.

4. The prism set according to claim 1, wherein said first and second prisms have the same refractive index.

5. The prism set according to claim 1, wherein said first incident face and said first refraction face of said first prism cooperatively define an angle ranging 55° to 65°.

6. The prism set according to claim 1, wherein said second prism further has a second refraction face that is adjacent to and that cooperates with said second incident face to define a second angle ranging 35° to 45°.

7. The prism set according to claim 1, wherein the third refraction face that is adjacent to and that cooperates with said first incident face to define a third angle ranging 80° to 85°.

8. A light emitting apparatus comprising:
  a prism set for diffusing light rays including
  a first prism having a first incident face and a first refraction face that is adjacent to and that cooperates with said first incident face to define a first angle ranging 50° to 70°, and having a third refraction face for the light rays to exit from, wherein the third refraction face is located in a first light path which includes a total reflection on the first reflection face, a second prism having a second incident face that is generally parallel to said first refraction face, and having a second refraction face for the light rays to exit from, wherein the second refraction face is located in a second light path which includes no reflection, and a medium layer sandwiched between said first refraction face and said second incident face, and having a refractive index smaller than that of said first and second prisms; and a light source disposed below said prism set for emitting light rays into the prism set via said first incident face.

9. The light emitting apparatus according to claim 8, wherein said medium layer comprises an air gap.

10. The light emitting apparatus according to claim 9, wherein said air gap has a thickness ranging from 0.1 mm to 0.3 mm.

11. The light emitting apparatus according to claim 8, wherein said light source is disposed below and is spaced apart from said first prism at a distance less than 3 mm.

12. The light emitting apparatus according to claim 8, wherein a portion of said light rays emitted from said light source enters into said second prism via said second incident face after passing through said medium layer.

13. The light emitting apparatus according to claim 8, wherein said light source comprises an LED unit.

14. The light emitting apparatus according to claim 8, wherein said first and second prisms have the same refractive index.

15. The light emitting apparatus according to claim 8, wherein said first incident face and said first refraction face of said first prism cooperatively define a first angle ranging 55° to 65°.

16. The light emitting apparatus according to claim 8, wherein said second prism further has a second refraction face that is adjacent to and that cooperates with said second incident face to define a second angle ranging 35° to 45°.

17. The light emitting apparatus according to claim 8, wherein the third refraction face that is adjacent to and thatt cooperates with said first incident face to define a third angle ranging 80° to 85°.

18. A backlight module comprising:

a receptacle body having a bottom plate;

at least one light source disposed on said bottom plate;

a prism set disposed above said light source, and including a first prism having a first incident face and a first refraction face that is adjacent to and that cooperates with said first incident face to define a first angle ranging 50° to 70°, a second prism having a second incident face that is generally parallel to said first refraction face, and a medium layer sandwiched between said first refraction face and said second incident face, and having a refractive index smaller than that of said first and second prisms; and a diffusing plate disposed above said prism set.

19. The backlight module according to claim 18, wherein said medium layer comprises an air gap.

20. The backlight module according to claim 18, wherein said light source includes pluralities of point light units disposed in a row.

21. The backlight module according to claim 20, wherein said pluralities of point light units are arranged as pluralities of rows, and two said prism sets that are deposited on an adjacent pair of said rows have two said first refraction faces whose slopes are opposite.

22. The backlight module according to claim 20, wherein said pluralities of point light units are arranged in an array manner.

23. The backlight module according to claim 22, wherein each of said pluralities of point light units is below one said prism set, and two of said first refraction faces of an adjacent pair of said prism sets define different refraction directions.

* * * * *